(12) United States Patent
Swainson

(10) Patent No.: US 7,971,507 B2
(45) Date of Patent: Jul. 5, 2011

(54) LUBRICATION ARRANGEMENT

(75) Inventor: Richard J. Swainson, Derby (GB)

(73) Assignee: Rolls-Royce PLC, London (GB)

( * ) Notice: Subject to any disclaimer, the term of this patent is extended or adjusted under 35 U.S.C. 154(b) by 248 days.

(21) Appl. No.: 12/232,440

(22) Filed: Sep. 17, 2008

(65) Prior Publication Data

US 2009/0020365 A1  Jan. 22, 2009

Related U.S. Application Data

(63) Continuation of application No. 11/138,306, filed on May 27, 2005, now abandoned.

(30) Foreign Application Priority Data

Jun. 25, 2004 (GB) .................................. 0414235.2

(51) Int. Cl.
*F16H 57/04* (2010.01)
(52) U.S. Cl. ..................................... 74/606 R; 184/6.12
(58) Field of Classification Search .................... 74/417, 74/467, 468, 416; 184/6.12; 475/159
See application file for complete search history.

(56) References Cited

U.S. PATENT DOCUMENTS

| | | |
|---|---|---|
| 2,015,108 A | 9/1935 | Harper |
| 3,383,937 A | 5/1968 | Franz et al. |
| 3,796,283 A | 3/1974 | Raby |
| 3,931,783 A | 1/1976 | Croisant |
| 4,018,097 A | 4/1977 | Ross |
| 4,648,485 A | 3/1987 | Kovaleski |
| 4,667,774 A | 5/1987 | Roberge |
| 5,232,291 A | 8/1993 | Kuan |
| 5,251,725 A | 10/1993 | Barrett |
| 5,299,657 A | 4/1994 | Hikes |
| 5,316,106 A | 5/1994 | Baedke et al. |
| 5,363,723 A | 11/1994 | Hoffman |
| 5,472,383 A | 12/1995 | McKibbin |
| 5,709,135 A | 1/1998 | Baxter |
| 6,012,348 A | 1/2000 | Roth et al. |
| 6,135,241 A | 10/2000 | Ganguly et al. |
| 6,267,203 B1 | 7/2001 | Brissette et al. |
| 6,830,096 B1 | 12/2004 | Fett et al. |
| 6,997,284 B1 | 2/2006 | Nahrwold |
| 2003/0124013 A1 | 7/2003 | Szczepanski et al. |

FOREIGN PATENT DOCUMENTS

| | | |
|---|---|---|
| DE | 43 38 216 A1 | 5/1995 |
| DE | 102 48 806 A1 | 4/2004 |
| GB | 2 223 819 A | 4/1990 |
| WO | WO 03/046416 A1 | 6/2003 |

*Primary Examiner* — Thomas R Hannon
*Assistant Examiner* — Phillip A Johnson
(74) *Attorney, Agent, or Firm* — Oliff & Berridge, PLC

(57) ABSTRACT

A lubrication arrangement for interlocking gears 2, 3 is configured by a housing 1 which incorporates sections 1a, 1b of a snail cross-section. Thus, rotating gears 2, 3 are positioned to generate a centrifugal pumping effect between those gears 2, 3 and the housing sections 1a, 1b which drives scavenged oil flow into a volute 11 formed by the opposing surface of the housing 1a, 1b. The scavenged oil is driven in the direction 13 towards an off-take 12 configured such that there is a minimum available cross-sectional area 14 between the housing at the intermeshing of the gears 2, 3 at an interlocking location 4. In such circumstances the scavenged oil is driven at relatively high speed through the off-take 12. Such relatively high speed scavenged oil 15 can be used for displacement scavenging in other parts of an engine or machine where problems exist with oil residence.

6 Claims, 1 Drawing Sheet

LUBRICATION ARRANGEMENT

Figure 1:
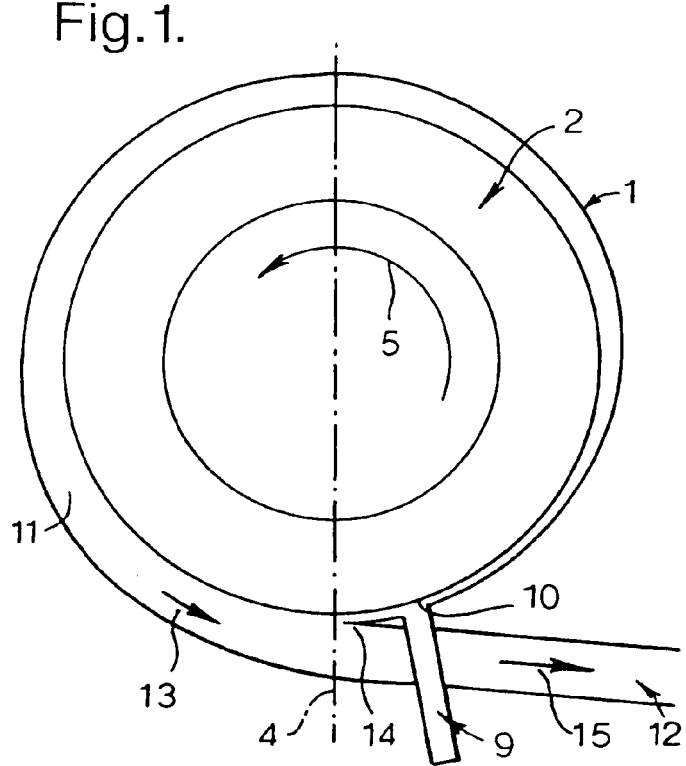

This is a Continuation of application Ser. No. 11/138,306 filed May 27, 2005. The disclosure of the prior application is hereby incorporated by reference herein in its entirety.

The present invention relates to lubrication arrangements and more particularly to lubrication arrangements for inter-locking gears.

Scavenging of oil utilised for lubrication and cooling between interlocking meshing gears is important in order to regulate the presentation of such oil for achievement of acceptable performance criteria. Oil needs to be scavenged from the gear box and bearing compartment as if there is a significant oil residence time then the oil may degrade by carbonisation as it becomes too hot.

Previously, oil turbulence between gears has been considered a nuisance in view of its possibility for back flow ingress between the gears inhibiting oil mass flow rate and therefore increasing residence time. In such circumstances generally the gear box casing has incorporated a volute in order to ensure capture collection of the centrifugally dispersed oil from the rotating gears. Essentially, the volute comprises a shaped recess to facilitate collection and reduce back splash. A low power vacuum pump is then utilised in order to circulate the oil typically through coolers and filters prior to re-injection at an appropriate position towards the intermeshing gears.

It is known that the optimum position for oil injection for a bevel gear meshing is immediately after such gear teeth meshing. In such circumstances, an oil scavenge off-take ideally should be at a position which substantially coincides with the mesh location between the inter-locking gear teeth. Thus, uptake of injected oil will then be maximized to improve operational effect.

In accordance with the present invention there is provided a lubrication arrangement for a gear combination, the arrangement comprising a housing for positioning about inter-locking gears, the housing including a scavenge off-take positioned substantially where the inter-locking gears come together at a mesh location and substantially tangential to the outer diameter of those inter-locking gears for scavenging oil at that mesh position.

Normally, an oil injector is positioned immediately after the mesh location.

Typically, the scavenge off-take has a maximized chordal cross-sectional area towards the centre of the interlocking gears to improve oil scavenging effect.

Normally, the oil injector is perpendicular to and directed towards the centre of the inter-locking gears. Generally, the oil injector is positioned at a location for minimised cross-sectional area between the housing and the oil injector.

Typically, the lubrication arrangement is arranged whereby in use rotation of the inter-locking gears creates an oil pressure directing scavenged oil flow towards the off-take.

Normally, the housing has a snail or clothoid or spiral cross-section.

Typically, the inter-locking gears are bevel gears. Possibly, the bevel gears are arranged in a perpendicular relationship to each other.

Also, in accordance with the present invention there is provided a housing for a gear combination, the housing including a scavenge off-take positioned in use relative to inter-locking gears where those inter-locking gears come together at a mesh position and substantially tangential to the outer diameter of those inter-locking gears for scavenging oil at that mesh location.

Normally, the housing has a snail or clothoid or spiral cross-section whereby in use variation in the available cross-sectional area between the inter-locking gears and the housing creates an effective centrifugal pump facilitating oil scavenging in use towards the scavenge off-take.

Figure 2:
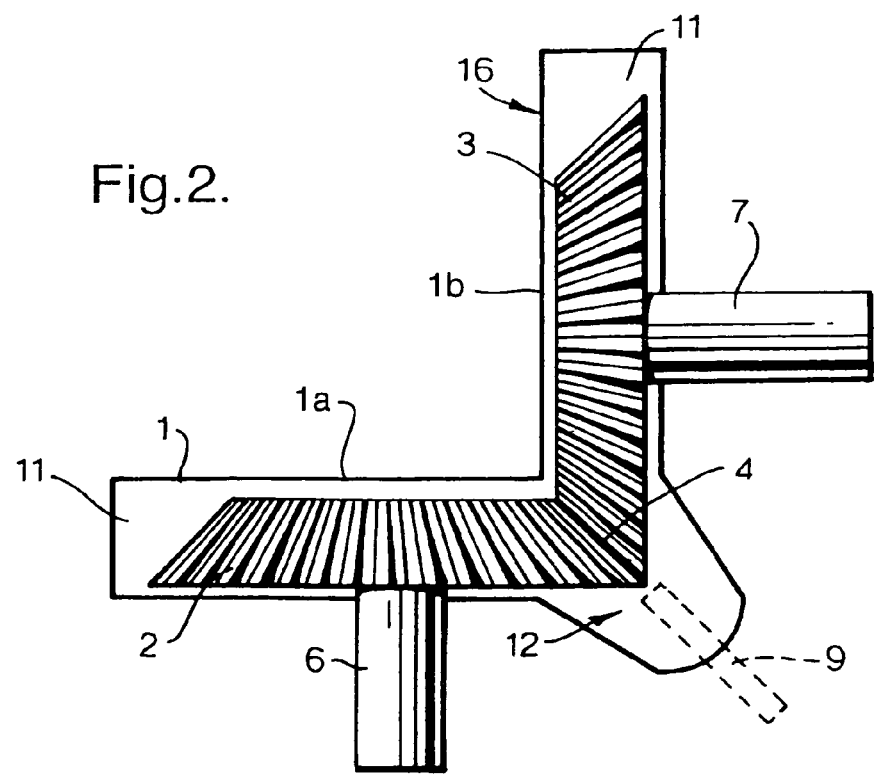

An embodiment of the present invention will now be described by way of example and with reference to the accompanying drawings in which;

FIG. 1 is a schematic plan cross-section of one interlocking gear in accordance with a lubrication arrangement of the present invention; and, FIG. 2 is a schematic front cross-section of inter-locking gears in accordance with the present invention.

Referring to the figures illustrating a lubrication arrangement in accordance with the present invention incorporated within a gear housing 1 with gears 2, 3 inter-locking at a mesh inter-locking location 4 (FIG. 2). Thus, as gear 2 rotates in the direction of arrowhead 5, a reciprocal rotation is driven in gear 3 through the intermeshing of gear teeth at the inter-locking location 4. Generally, the gears 2, 3 are respectively coupled to shafts 6, 7 with one a drive shaft and the other a driven shaft to provide mechanical work or transfer. Operation of such bevel gears in an inter-locking relationship as depicted in FIG. 2 is well known.

The present invention relates to providing oil for lubrication and cooling of the gears 2, 3. As indicated previously, it is known that providing for oil injection just downstream from the inter-locking location 4 achieves the best results. In FIG. 2 the interlocking position 4 is nominally illustrated by dotted line 8. Thus, with rotation in the direction of arrowhead 5, an oil injector 9 is positioned immediately after the meshing of the gear 2, 3 teeth at the interlocking location 4 (FIG. 2). In such circumstances, the injected oil is effective in providing lubrication and cooling between the gear teeth of the intermeshing and interlocking gears 2, 3 after an almost complete rotation. It will be understood that rotation through centrifugal forces throws off excess oil to be collected within the housing 1 such that the optimised retention of oil is provided upon the gear teeth when subjected to intermeshing at the interlocking location 4. In such circumstances it will be appreciated that the thrown off oil must be collected if appropriate operation of the gears is to be achieved. As indicated above, this was previously performed by providing a low power vacuum pump which essentially evacuates oil from the housing 1.

The present invention utilises the potential centrifugal pump effect of the gears 2, 3 in respective parts of the housing 1. Thus, description of housing portion 1a is also illustrative of housing portion 1b (FIG. 2). In short the housing portion 1a has a snail or clothoid or spiral type cross-section such that a substantially circular disc profile of the gear 2 is positioned whereby the cross-sectional area 10 at the point of injection of oil from the injected 9 is reduced and therefore the cross-sectional area substantially increases through the rotational cycle of the gear 2 in the direction of arrowhead 5. The effect of this operation in both housing portions 1a, 1b is to create the centrifugal pumping effect through the centrifugal throw off forces upon the oil ejected towards the gear teeth immediately after intermeshing at the interlocking location 4. This centrifugal pumping effect throws the excess oil towards a volute 11 formed in the outer circumference of the housing portions 1a, 1b. This volute 11 leads to an oil scavenge off-take 12. In such circumstances there is a driving force in the direction of arrowhead 13 as a result of the centrifugal pumping effect of the gears 2, 3 which leads to oil being scavenged or drawn off into the off-take 12.

It will be understood that for best performance, the off-take 12 should be substantially tangential to the outer diameter of the gears 2, 3 immediately prior to the point of minimum cross-sectional area 14. It will be understood that this cross-sectional area 14 essentially defines the area by which scavenged oil flow in the direction of arrowhead 13 may leak to remain within the housing 1 rather than pass along the off-take 12. Thus, a balance must be struck between retaining a sufficient cross-sectional area 14 and for that matter cross-sectional area 10 at the ejector 9 to accommodate for variations in gear 2, 3 dimensions, rotational eccentricity and normal operational wear and tear whilst achieving low bypass leakage of scavenged oil.

The oil injector 9 as illustrated is substantially perpendicular to the gear 2, 3 in order to achieve direct impingement and therefore penetration into the gear teeth intermeshing at the interlocking location 4. In short, the interlocking gears 2, 3 generate a pressurised oil scavenge. This pressurisation is utilised to improve oil scavenge about the interlocking gears 2, 3 but can also be used to improve scavenging from bearings (not shown) adjacent to the gears 2, 3 by utilising the bevel gear scavenge oil as a relatively high speed flow in a jet pump arrangement.

By the snail or clothoid cross-section for the housing sections 1a, 1b, it will be understood that there is a natural forcing of the scavenged oil down the off-take 12. It will also be understood that the relatively high speed educed oil flow in the direction of arrowhead 15 through the out-take 12 may be used to stimulate flow displacement of oil from other areas of an engine or machine. Such displacement will assist with oil scavenge in areas of poor or difficult flow for oil scavenging processes. In such circumstances there is a potential for reduced power demand placed upon specific oil scavenge pumps necessary for such poor or difficult areas of scavenge as well as improved overall scavenging efficiency whereby there is less likelihood of oil hiding or retention within those poor or difficult scavenging areas of an engine or a machine. Clearly, by ensuring more consistent oil throughput, there is less oil residence time within the arrangement and so the likelihood of oil degradation through excessive oil temperature is reduced.

It will be understood that the gears 2, 3 through their shafts 6, 7 will have a principal mechanical operation within the engine or machine. The present utilisation of the centrifugal pumping effects of intermeshing the gears 2, 3 within the housing portions 1a, 1b will provide a limited amount of drag upon those principal mechanical operations but generally within the operational ranges of an engine or machine will be insignificant in proportion to the power transfer through the gears 2, 3.

As particularly illustrated in FIG. 1, the off-take 12 is generally expansive from the volute 11 which in itself is expansive from the minimum cross-sectional area 14 through the circumference of the housing 1a. Thus, the cross-sectional area of the off-take 12 is maximized to essentially scoop the scavenged oil pumped by the centrifugal effect of the gears 2, 3 in rotation in the direction 13.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A lubrication arrangement for a gear combination, the arrangement comprising a housing for positioning about inter-locking gears, the inter-locking gears comprising a pair of bevel gears arranged perpendicular to each other, the housing having a spiral cross-section and including a scavenge off-take positioned substantially where the inter-locking gears come together at a mesh location and substantially tangential to the outer diameter of the inter-locking gears for scavenging oil at the mesh position.

2. An arrangement as claimed in claim 1 wherein an oil injector is positioned immediately after the mesh location.

3. An arrangement as claimed in claim 2 wherein the oil injector is perpendicular to and directed towards the centre of the inter-locking gears.

4. An arrangement as claimed in claim 2 wherein the oil injector is positioned at a location for minimized cross-sectional area between the housing and the oil injector.

5. An arrangement as claimed in claim 1 arranged such that in use rotation of the inter-locking gears creates an oil pressure directing scavenged oil flow towards the off-take.

6. A housing for a gear combination, the housing for positioning about inter-locking gears, the inter-locking gears comprising a pair of bevel gears arranged perpendicular to each other and including a scavenge off-take positioned in use relative to the inter-locking gears where the inter-locking gears come together at a mesh position and substantially tangential to the outer diameter of the inter-locking gears for scavenging oil at that mesh location, wherein the housing has a spiral cross-section whereby in use variation in the available cross-sectional area between the inter-locking gears and the housing creates an effective centrifugal pump facilitating oil scavenging in use towards the scavenge off-take.

* * * * *